Oct. 26, 1948.   F. M. SCHARFF   2,452,266
ROLLING MILL ROLL
Filed June 7, 1944
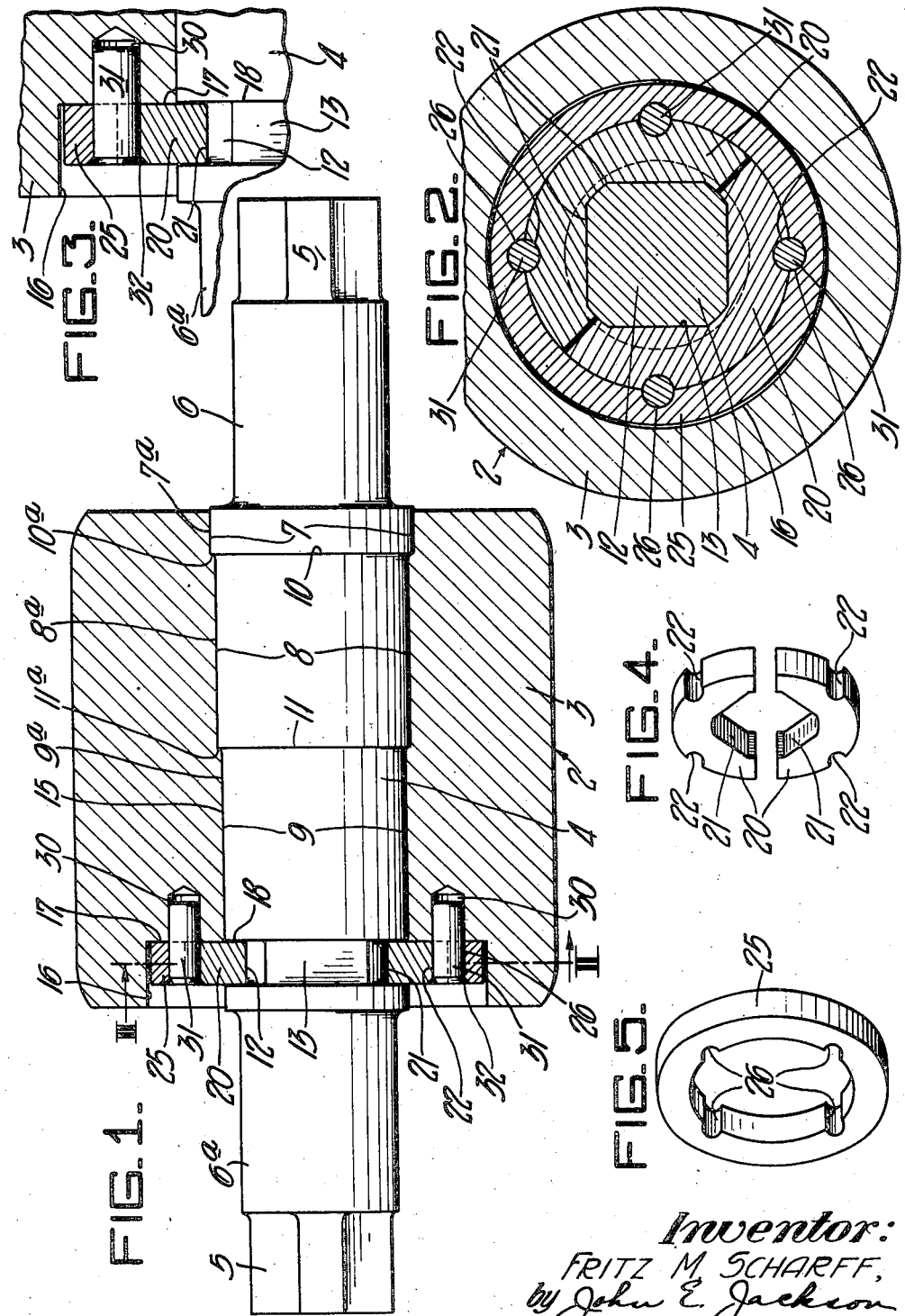
Inventor:
FRITZ M. SCHARFF,
by John E. Jackson
his Attorney.

Patented Oct. 26, 1948

2,452,266

UNITED STATES PATENT OFFICE 2,452,266

ROLLING MILL ROLL

Fritz M. Scharff, Lorain, Ohio, assignor to National Tube Company, a corporation of New Jersey Application June 7, 1944, Serial No. 539,098

6 Claims. (Cl. 80—58)

This invention relates to rolling mill roll and, more particularly, to composite rolls having separable face or rolling portions and spindle or shaft portions.

Heretofore, it has been customary to form the driving connection between the face member and the spindle member of a composite roll by means of a key inserted in superimposed longitudinally extending slots in the two members. In such a connection, a large portion of the driving force is concentrated at corners of the slot in the face member, causing cracks to form therein at such points, thereby necessitating discarding such face members before the outer faces thereof are appreciably worn.

It is accordingly an object of this invention to overcome the foregoing disadvantages of the keyed connection between the face member and the spindle member of composite rolling mill rolls.

It is another object to provide a composite roll which is not subject to cracks resulting from the transmission of force through the driving connection between face member and the spindle member thereof.

It is a further object of the present invention to provide a composite rolling mill roll having an improved driving connection between the component parts thereof.

The foregoing and further objects will be apparent from the specification and drawings wherein:

Figure 1 is an elevational view of the roll assembly of my invention, partly in section;

Figure 2 is a section on lines II—II of Figure 1;

Figure 3 is an enlarged partial section of the ring and pin assembly; and

Figures 4 and 5 are views of the split ring and mounting ring of my improved assembly.

Referring more particularly to the drawings, the numeral 2 indicates a composite roll having a face member 3 and a spindle or shaft 4. Spindle 4 may have its end formed into wobblers 5 with adjacent necks 6 and 6a and with the intermediate portion between the necks machined to provide stepped diameters 7, 8, and 9 with shoulders 10 and 11 therebetween. Near the outer end of the diameter portion 9 adjacent the neck 6a, there is provided a grooved portion 12, the periphery 13 of which is noncircular and preferably substantially square as shown in Figure 2.

The annular face member 3 is disposed on the spindle 4 and has a bore 15 therethrough machined to provide stepped counterbores 7a, 8a, and 9a, and shoulders 10a and 11a, which closely engage the diameters 7, 8, and 9, and the shoulders 10 and 11 of the spindle 4. A counterbore 16 is provided in the face member 3 at the opposite end from the shoulder 10a. The counterbore 16 surrounds the groove 12 and is of such depths that the bottom 17 thereof substantially coincides with the inner end 18 of the groove 12.

Disposed in the counterbore 16 and the groove 12 is a split ring or drive plate 20 having the inner surface 21 thereof machined to closely engage the periphery 13 of the groove 12. Around the outer surface thereof, there are provided a plurality of semi-circular grooves 22. A housing ring 25 surrounds the split ring 20 and has a tight fit therewith. The ring 25 has a plurality of semi-circular grooves 26 therein on the inner side thereof of the same size as the grooves 22 in the split ring 20 and which coincide therewith and with holes 30 in the face members 3 for the reception of pins 31. Pins 31 are disposed in the matching grooves 22 and 26 and are affixed to the split ring 20 and housing 25 by suitable means such as welding, as indicated at 32.

In assembling a roll embodying the principles of this invention, a spindle member is obtained with the inner portion thereof machined to provide stepped diameters 7, 8, and 9, with shoulders 10 and 11 therebetween. A groove 12 is machined therein near the outer end of the diameter 9 adjacent the neck 6a having a periphery which is preferably non-circular and preferably substantially square. The face member 3 having a bore therethrough is counterbored to provide close engagement with the stepped diameters 7, 8, and 9, and the shoulders 10 and 11 of the spindle 4. Face member 3 is then positioned on the spindle 4 so that the shoulders 10 and 10a, 11 and 11a are closely engaged. The split ring or driving plate 20 is then positioned in the groove 12 and the counterbore 16 and the housing ring 25 which has been machined to tightly engage the split ring is then placed therearound. A plurality of holes are then drilled through the split ring 20 and the housing ring 25 at the juncture thereof and into the face member 3. After the holes have been suitably counterbored, pins 31 are inserted therein and welded to the split ring 20 and the housing ring 25.

It is now obvious that rotation of the shaft or spindle 4 will be transmitted to the face member 3 through the split ring or half driving plates 20. Due to the close engagement of the split ring 20 and the periphery 13 of the groove 12, there will be no relative motion therebetween nor between the split ring 20 and the face member 3 due to the tight fit of the pins 31 in the holes 30.

In this manner, rotative power transmitted to the face member 3 from the spindle 4 will not be concentrated at any particular points and accordingly continued use thereof will not cause fatigue cracks to develop.

While I have shown and described one specific embodiment of my invention, it will be understood that this embodiment is merely for the purpose of illustration and description and that various other forms may be devised within the scope of my invention, as defined in the appended claims.

I claim:

1. A composite roll comprising a spindle member having an annular groove therein, the inner periphery of which is non-circular, and a face member mounted on said spindle having a counterbore at one end thereof surrounding said groove, a split ring disposed in said groove and said counterbore, the inner periphery of said split ring having a close fit with the periphery of said groove, a ring disposed around said split ring and means for securing said ring and said split ring to said face member.

2. A composite roll, as in claim 1, wherein the periphery of the groove and the inner periphery of the split ring is substantially square.

3. A composite roll comprising a spindle member having an annular groove therein, a shoulder on said spindle at a spaced point from said groove, the periphery of said groove being non-circular, and a face member mounted on said spindle member, one end of said face member engaging said shoulder and having a counterbore at the opposite end thereof surrounding said groove, a split ring disposed in said groove and said counterbore, the periphery of said split ring engaging the periphery of said groove, a ring disposed around said split ring and means for securing said ring and said split ring to said face member to form a driving connection between said face member and said spindle member.

4. A composite roll, as in claim 3, wherein the periphery of the groove and the inner periphery of the split ring is substantially square.

5. A composite roll comprising a spindle member having an annular groove therein, a shoulder on said spindle at a spaced point from said groove, the periphery of the groove being substantially square, and a roll member mounted on said spindle and having a counterbore at each end thereof, one of said counterbores engaging said shoulder and the other surrounding said groove, a split ring disposed in said groove and said last mentioned counterbore engaging the periphery of said groove, a ring disposed around said split ring in engagement therewith and means securing said ring and said split ring to said face member to form a driving connection between said face member and said spindle member.

6. A composite roll comprising a spindle member having an annular groove therein, substantially the entire inner periphery of the groove being non-circular, and a roll member mounted on said spindle having an end face adjacent said groove, a split ring disposed in said groove and abutting said end face, the inner periphery of said split ring having a close fit with the non-circular periphery of said groove, the non-circular periphery of the groove and the contacting inner periphery of the split ring combining to prevent relative rotation therebetween and means securing said ring to said roll member to establish a driving connection between said roll member and said spindle member.

FRITZ M. SCHARFF.

REFERENCES CITED

The following references are of record in the file of this patent:

UNITED STATES PATENTS

| Number | Name | Date |
| --- | --- | --- |
| 1,302,497 | Barbour | May 6, 1919 |
| 1,670,381 | Rogers | May 22, 1928 |
| 1,739,939 | Baehr | Dec. 17, 1929 |
| 2,026,454 | Benzing | Dec. 31, 1935 |

FOREIGN PATENTS

| Number | Country | Date |
| --- | --- | --- |
| 10,989 | Germany | Sept. 18, 1880 |
| 265,289 | Germany | Oct. 7, 1913 |
| 454,616 | Germany | Jan. 14, 1928 |